United States Patent (12)
Kim et al.

(10) Patent No.: US 9,520,973 B2
(45) Date of Patent: Dec. 13, 2016

(54) METHOD FOR TRANSMITTING REFERENCE SIGNAL TO ANTENNA PORT IN WIRELESS ACCESS SYSTEM

(71) Applicant: LG ELECTRONICS INC., Seoul (KR)

(72) Inventors: Jinmin Kim, Anyang-si (KR); Hyunsoo Ko, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/414,064

(22) PCT Filed: Jul. 12, 2013

(86) PCT No.: PCT/KR2013/006275
§ 371 (c)(1),
(2) Date: Jan. 9, 2015

(87) PCT Pub. No.: WO2014/010994
PCT Pub. Date: Jan. 16, 2014

(65) Prior Publication Data
US 2015/0180628 A1 Jun. 25, 2015

Related U.S. Application Data

(60) Provisional application No. 61/671,087, filed on Jul. 12, 2012.

(51) Int. Cl.
*H04W 72/04* (2009.01)
*H04L 5/00* (2006.01)
(Continued)

(52) U.S. Cl.
CPC ........... *H04L 5/0048* (2013.01); *H04B 7/0667* (2013.01); *H04B 7/0671* (2013.01);
(Continued)

(58) Field of Classification Search
CPC ... H04B 7/0667; H04B 7/0671; H04B 7/0891; H04B 7/0894; H04L 5/0048; H04L 5/0053; H04W 72/0413; H04W 88/02
See application file for complete search history.

(56) References Cited

U.S. PATENT DOCUMENTS

2011/0176634 A1* 7/2011 Yoon ................. H04L 5/0023
375/295
2011/0244877 A1* 10/2011 Farajidana ............ H04L 5/0023
455/452.2
(Continued)

FOREIGN PATENT DOCUMENTS

WO 2011/115421 9/2011
WO 2011/145886 11/2011

OTHER PUBLICATIONS

Alcatel-Lucent Shanghai Bell, et al., "Considerations on CSI feedback enhancements for high-priority antenna configurations," 3GPP TSG-RAN WG1 #66, R1-112420, Aug. 2011, 7 pages.
(Continued)

*Primary Examiner* — Andrew Lai
*Assistant Examiner* — M Mostazir Rahman
(74) *Attorney, Agent, or Firm* — Lee, Hong, Degerman, Kang & Waimey

(57) ABSTRACT

The present invention provides various methods for transmitting a channel state information reference signal (CSI-RS) by varying a transmission period for each antenna port or antenna port group, and also provides apparatuses supporting the methods. The method for receiving a CSI-RS in a wireless access system according to one aspect of the present invention may comprise the steps of: receiving a CSI-RS component information element for setting CSI-RS transmission periods for two or more antenna ports to be mutually different; receiving CSI-RSs for each of the two or more antenna ports based on the CSI-RS component information element; and acquiring channel state information for each of the two or more antenna ports based on the received CSI-RS.

12 Claims, 10 Drawing Sheets

(Semi-)Static vertical sectorization

Dynamic 3D beamforming

(51) Int. Cl.
*H04B 7/06* (2006.01)
*H04B 7/08* (2006.01)
*H04W 88/02* (2009.01)

(52) U.S. Cl.
CPC ......... *H04B 7/0891* (2013.01); *H04B 7/0894* (2013.01); *H04L 5/0053* (2013.01); *H04W 72/0413* (2013.01); *H04W 88/02* (2013.01)

(56) References Cited

U.S. PATENT DOCUMENTS

| | | | |
|---|---|---|---|
| 2013/0039349 A1* | 2/2013 | Ebrahimi Tazeh Mahalleh | H04L 1/0013 370/336 |
| 2013/0083681 A1* | 4/2013 | Ebrahimi Tazeh Mahalleh | H04L 5/0057 370/252 |
| 2013/0136100 A1* | 5/2013 | Yoon | H04W 72/0446 370/330 |

OTHER PUBLICATIONS

Samsung, "Prioritization of CSI feedback enhancement scenarios for DL-MIMO," 3GPP TSG RAN WG1 Meeting #66, R1-112515, Aug. 2011, 3 pages.
PCT International Application No. PCT/KR2013/006275, Written Opinion of the International Searching Authority dated Oct. 24, 2013, 21 pages.

* cited by examiner

FIG. 7
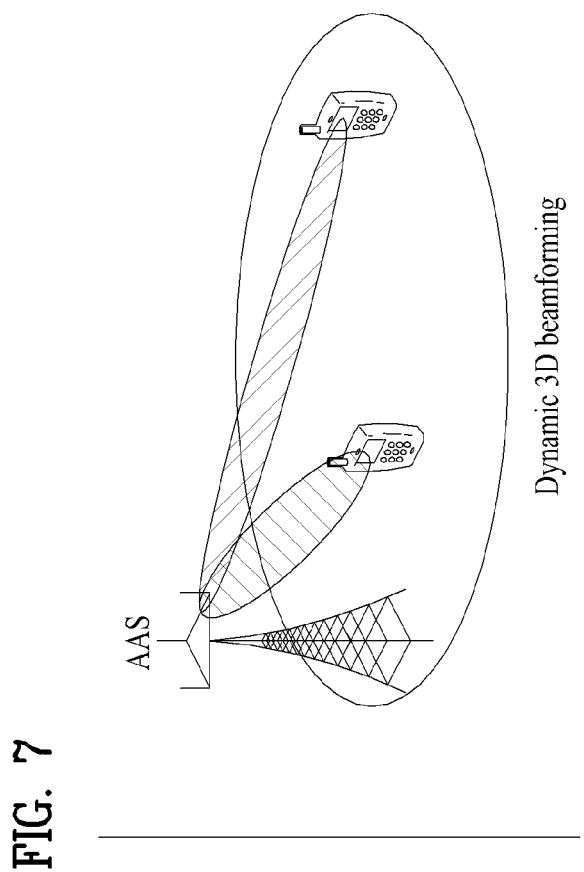
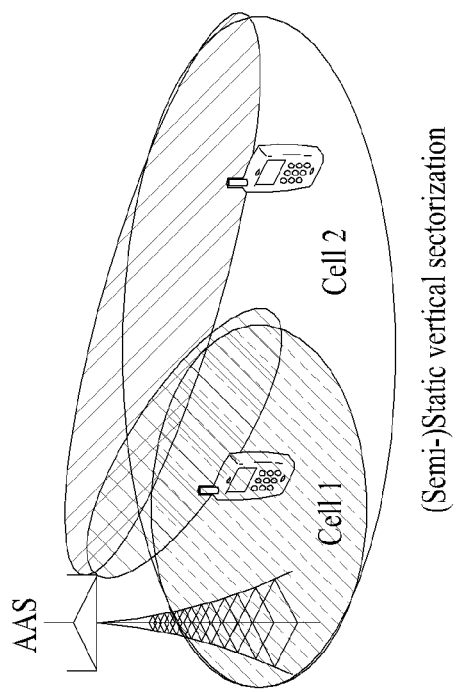

… (1)

METHOD FOR TRANSMITTING REFERENCE SIGNAL TO ANTENNA PORT IN WIRELESS ACCESS SYSTEM

CROSS-REFERENCE TO RELATED APPLICATIONS

This application is the National Stage filing under 35 U.S.C. 371 of International Application No. PCT/KR2013/006275, filed on Jul. 12, 2013, which claims the benefit of U.S. Provisional Application Ser. No. 61/671,087, filed on Jul. 12, 2012, the contents of which are all hereby incorporated by reference herein in their entirety.

TECHNICAL FIELD

The present invention relates to a wireless access system, and more particularly, to a method of transmitting a channel status information reference signal (CSI-RS) by varying a transmission period for each antenna port or each antenna port set and apparatus for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Tasks

One technical object of the present invention is to provide an efficient reference signal transmitting method.

Another technical object of the present invention is to provide a method of varying a transmission period of a reference signal for each antenna port in a massive antenna environment.

Further technical object of the present invention is to provide a method of varying a transmission period of a reference signal for each antenna port set in a massive antenna environment.

Another further technical object of the present invention is to provide a method of obtaining and transmitting a channel status information in case of varying a transmission period of a reference signal for each antenna or each antenna set.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

The present invention relates to various methods of transmitting a channel status information reference signal (CSI-RS) by varying a transmission period for each antenna port or each antenna port set and various apparatuses for supporting the same.

In one technical aspect of the present invention, provided herein is a CSI-RS receiving method in receiving a channel state information reference signal (CSI-RS) in a wireless access system, including the steps of receiving a CSI-RS configuration information element for differently setting transmission periods of CSI-RSs for each of at least two antenna ports, receiving the CSI-RSs for each of the at least two antenna ports based on the CSI-RS configuration information element, and obtaining a channel state information for each of the at least two antenna ports based on the received CSI-RS.

In another technical aspect of the present invention, provided herein is a user equipment in receiving a channel state information reference signal (CSI-RS) in a wireless access system, including a transceiver and a processor configured to control the CSI-RS reception, the processor configured to receive a CSI-RS configuration information element for differently setting transmission periods of the CSI-RS for each of at least two antenna ports, to receive the CSI-RSs for each of the at least two antenna ports based on the CSI-RS configuration information element, and to obtain a channel state information for each of the at least two antenna ports based on the received CSI-RS, using the transceiver.

Preferably, the CSI-RS configuration information element may include at least two subframe configuration parameters indicating the transmission periods of the at least two antenna ports, respectively.

Preferably, the user equipment may report the measured channel state information to a base station. In doing so, the channel state information may be transmitted on a physical uplink control channel (PUCCH) or a physical uplink shared channel (PUSCH).

In another technical aspect of the present invention, provided herein is a CSI-RS receiving method in receiving a channel state information reference signal (CSI-RS) in a wireless access system, including the steps of receiving a CSI-RS configuration information element for differently setting transmission periods of the CSI-RS for each of at least two antenna port sets, receiving the CSI-RSs for each of the at least two antenna port sets based on the CSI-RS configuration information element, and obtaining a channel state information for each of the at least two antenna port sets based on the received CSI-RS.

In further technical aspect of the present invention, provided herein is a user equipment in receiving a channel state information reference signal (CSI-RS) in a wireless access system, including a transceiver and a processor configured to control the CSI-RS reception, the processor configured to receive a CSI-RS configuration information element for differently setting transmission periods of the CSI-RS for each of at least two antenna port sets, to receive the CSI-RSs for each of the at least two antenna port sets based on the CSI-RS configuration information element, and to obtain a channel state information for each of the at least two antenna port sets based on the received CSI-RS, using the transceiver.

Preferably, the CSI-RS configuration information element may include at least two subframe configuration parameters indicating the transmission periods of the at least two antenna port sets, respectively.

More preferably, each of the at least two antenna port sets may include at least one or more antenna ports.

Moreover, the user equipment may report the channel state information to a base station. In doing so, the channel state information may be transmitted on a physical uplink control channel (PUCCH) or a physical uplink shared channel (PUSCH).

Advantageous Effects

According to embodiments of the present invention, the following effects and/or features are provided.

First of all, the present invention can efficiently transmit a reference signal for 3D beamformings different from each other in an angle variation for a horizontal/vertical beamforming.

Secondly, a transmission period of a reference signal can be varied for each antenna port in a massive antenna environment.

Thirdly, a transmission period of a reference signal can be varied for each antenna set in a massive antenna environment.

Therefore, by varying a CSI-RS transmission period for each antenna port or each antenna port set in a 3D beamforming, channel estimation of a downlink channel can be effectively performed.

Effects obtainable from the present invention are non-limited by the above mentioned effect. And, other unmentioned effects can be clearly understood from the following description by those having ordinary skill in the technical field to which the present invention pertains. Namely, unintended effects according to the implementations of the present invention can be also derived from the embodiments of the present invention by those skilled in the art to which the present invention pertains.

DESCRIPTION OF DRAWINGS

The accompanying drawings, which are included to provide a further understanding of the invention, illustrate embodiments of the invention and together with the description serve to explain the principle of the invention. In the drawings:

FIG. 7 is a diagram for one example of a beamforming usable for an embodiment of the present invention;

BEST MODE FOR INVENTION

Figure 1:
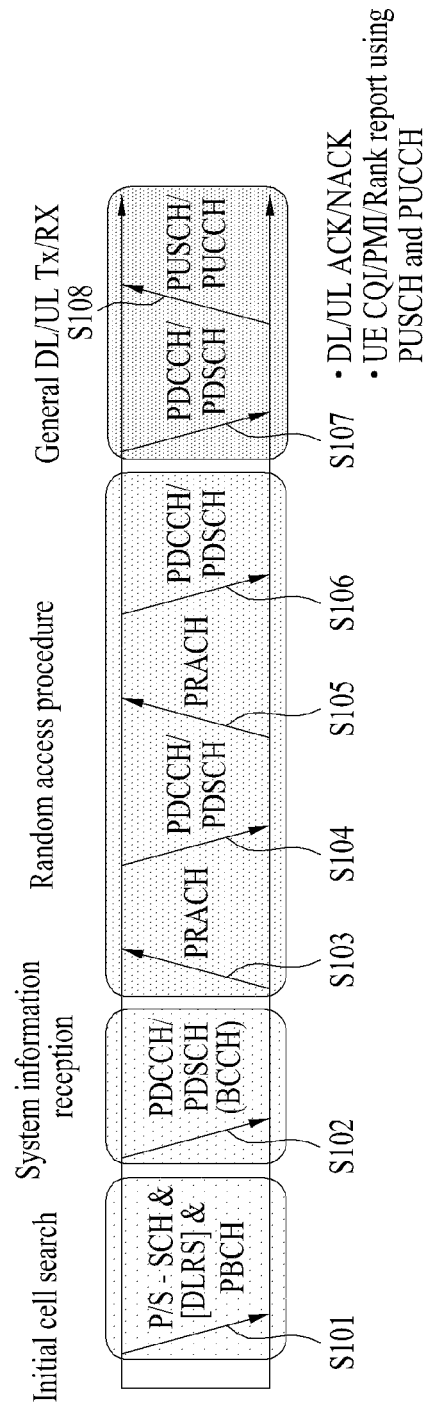
FIG. 1 illustrates physical channels and a general signal transmission method using the physical channels, which may be used in embodiments of the present invention.

Embodiments of the present invention provide various methods of transmitting a channel status information reference signal (CSI-RS) by varying a transmission period for each antenna port or each antenna port set and various apparatuses for supporting the same.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present invention may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present invention may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present invention, in the embodiments of the present invention may be explained by the above standard specifications. All terms used in the embodiments of the present invention may be explained by the standard specifications.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific terms in order to provide a thorough understanding of the present invention. However, it will be apparent to those skilled in the art that the specific terms may be replaced with other terms without departing the technical spirit and scope of the present invention.

For example, the term used in embodiments of the present invention, TA is interchangeable with time advance, timing adjustment, or time adjustment in the same meaning.

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present invention are described in the context of a 3GPP LTE/LTE-A system in order to clarify the technical features of the present invention, the present invention is also applicable to an IEEE 802.16e/m system, etc.

1.3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present invention.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB. During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
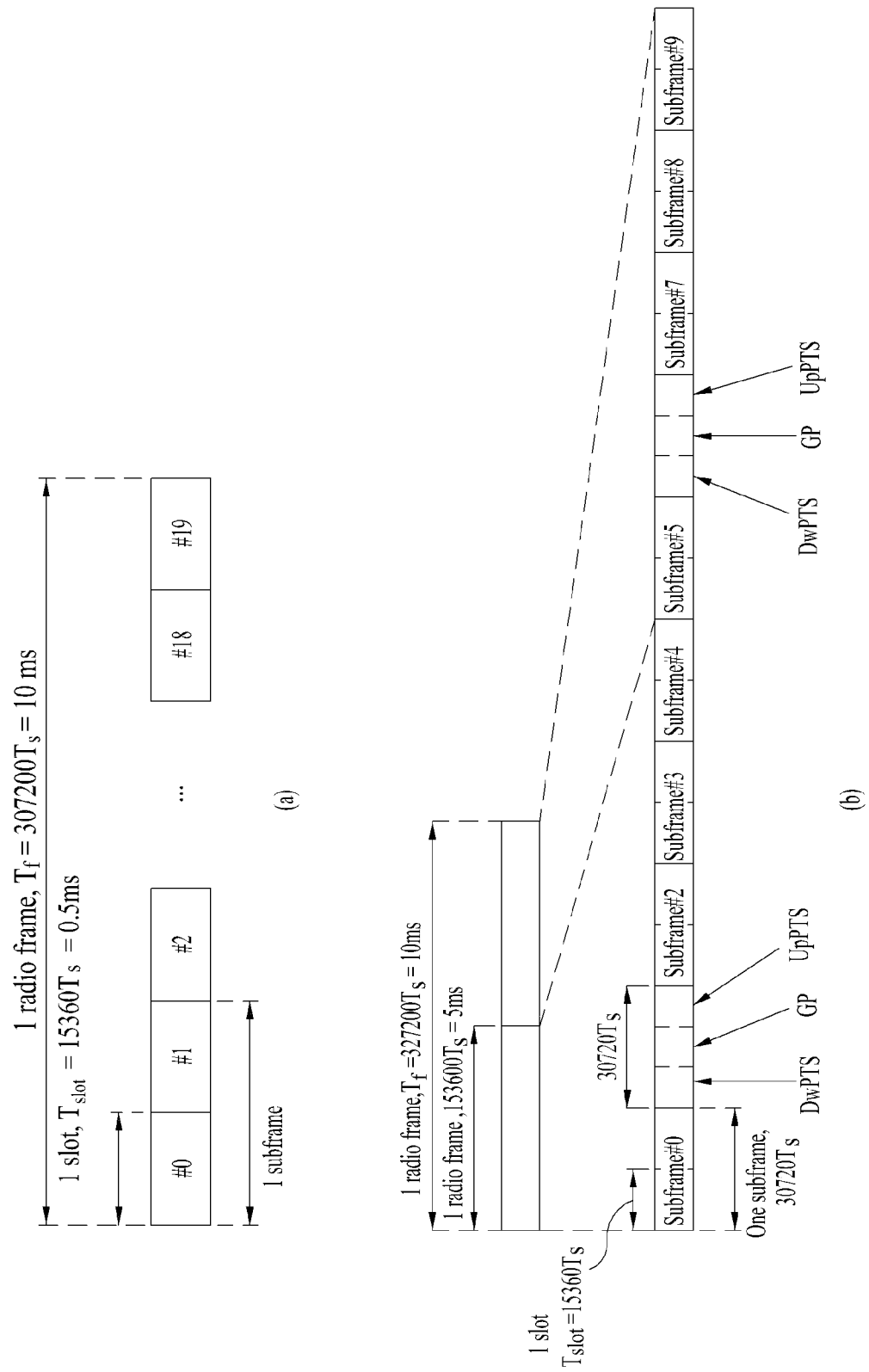
FIG. 2 illustrates radio frame structures used in embodiments of the present invention.

FIG. 2 illustrates exemplary radio frame structures used in embodiments of the present invention.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
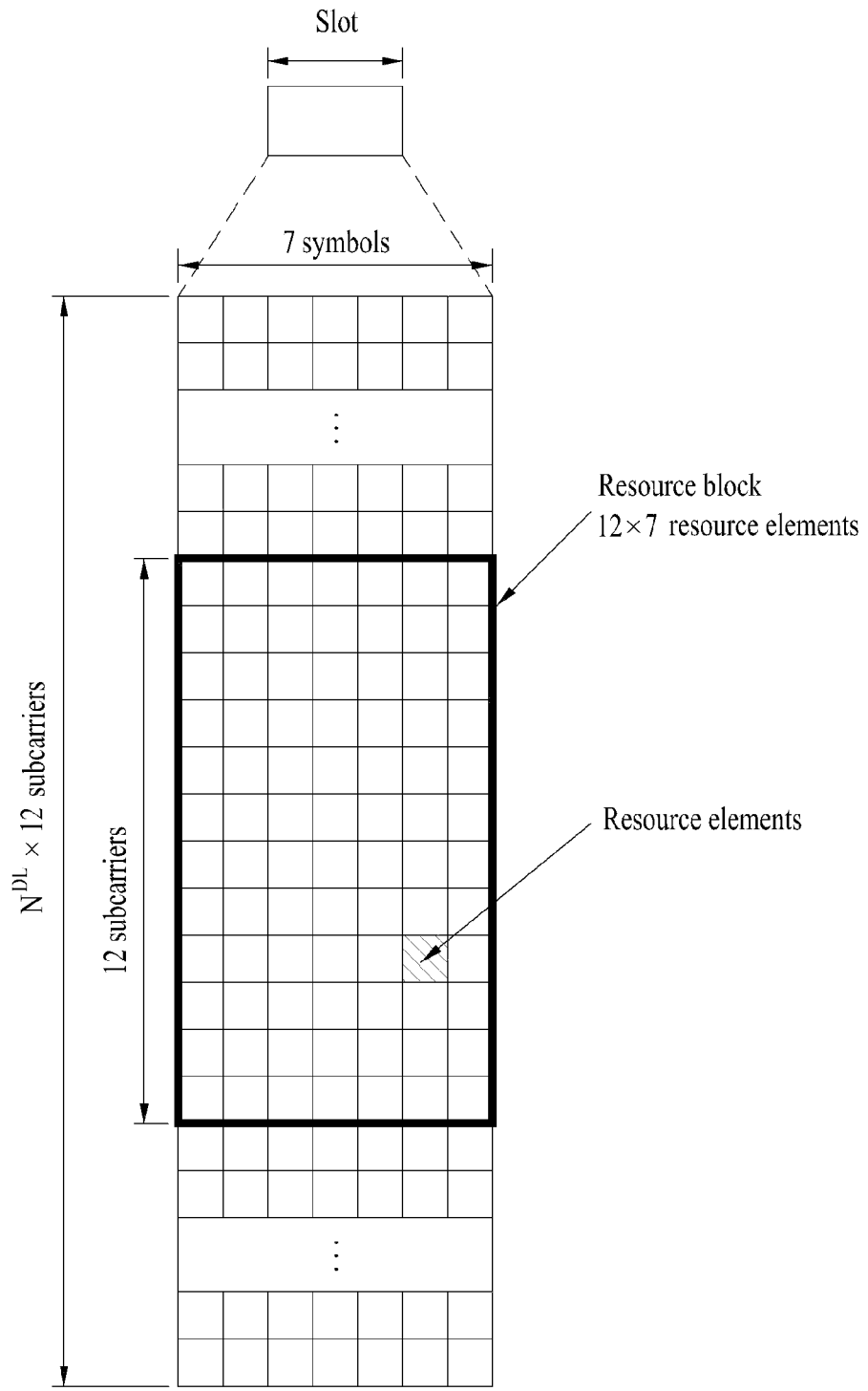
FIG. 3 illustrates a structure of a DownLink (DL) resource grid for the duration of one DL slot, which may be used in embodiments of the present invention.

FIG. 3 illustrates an exemplary structure of a DL resource grid for the duration of one DL slot, which may be used in embodiments of the present invention.

Referring to FIG. 3, a DL slot includes a plurality of OFDM symbols in the time domain. One DL slot includes 7 OFDM symbols in the time domain and an RB includes 12 subcarriers in the frequency domain, to which the present invention is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
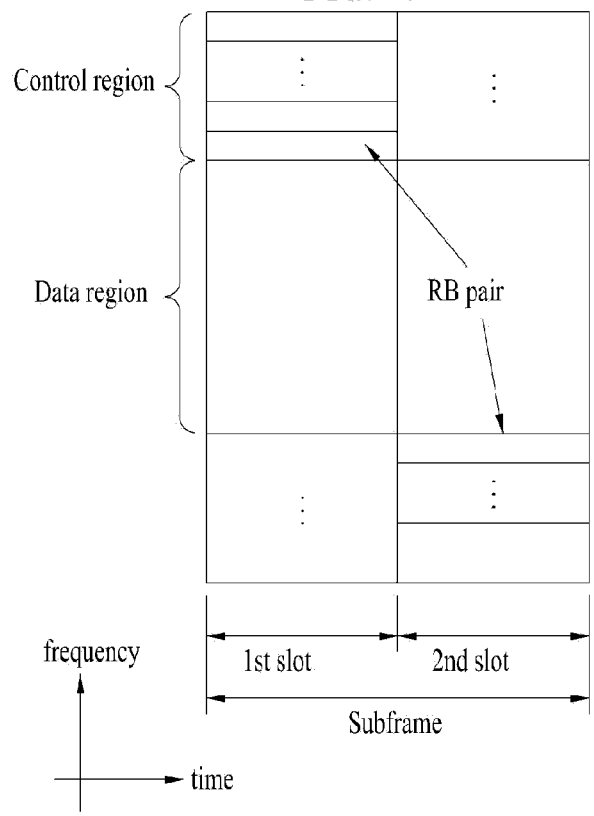
FIG. 4 illustrates a structure of an UpLink (UL) subframe, which may be used in embodiments of the present invention.

FIG. 4 illustrates a structure of a UL subframe which may be used in embodiments of the present invention.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
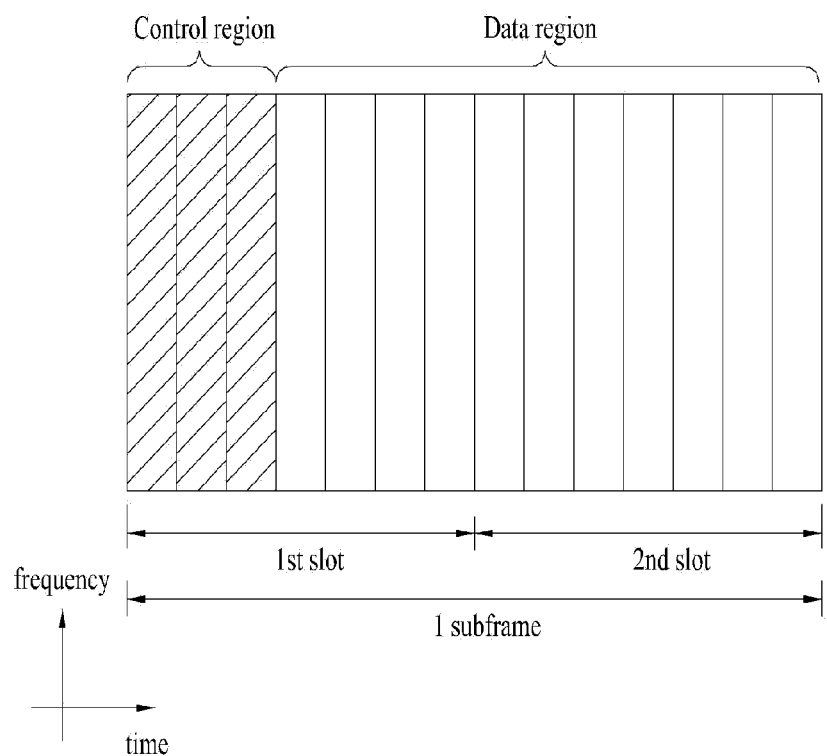
FIG. 5 illustrates a structure of a DL subframe, which may be used in embodiments of the present invention.

FIG. 5 illustrates a structure of a DL subframe that may be used in embodiments of the present invention.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE (=$\lfloor N_{REG}/9 \rfloor$) and the CCEs are indexed from 0 to NCCE−1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
| --- | --- |
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 7 transmission modes are available to UEs:
  (1) Single antenna port: port 0;
  (2) Transmit diversity;
  (3) Open-loop spatial multiplexing;
  (4) Closed-loop spatial multiplexing;
  (5) MU-MIMO;
  (6) Closed-loop rank-1 precoding; and
  (7) Single antenna port: port 5.

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k}-1$. $N_{CCE,k}$ is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 1 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k+m) \bmod \lfloor N_{CCE,k}/L \rfloor\}+i \qquad \text{[Equation 1]}$$

where $M^{(L)}$ is the number of PDCCH candidates with CCE aggregation level L to be monitored in the SS, m= 0, ..., $M^{(L)}-1$, i is the index of a CCE in each PDCCH candidate, and i=0, ..., L−1. k=$\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |

TABLE 5-continued

| Type | Search space $S_k^{(L)}$ Aggregation level L | Size [in CCEs] | Number of PDCCH candidates $M^{(L)}$ |
|---|---|---|---|
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k = (A \cdot Y_{k-1}) \bmod D \qquad \text{[Equation 2]}$$

where $Y_{-1} = n_{RNTI} \neq 0$, $n_{RNTI}$ indicating an RNTI value. A=39827 and D=65537.

2. Carrier Aggregation (CA) Environment

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present invention, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present invention may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC.

If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present invention.

3. Massive MIMO (Multi-Input Multi-Output)

Massive MIMO maximizes a beam gain using a number of antennas and is able to eliminate effects of inter-cell interference (ICI) and noise through the maximized beam gain. In order to apply such a massive MIMO system to a downlink or uplink of a cellular network, a corresponding scheme such as TDD or FDD may differ depending on a duplex scheme.

For instance, in case of TDD, a downlink and an uplink use the same frequency band and are distinguished from each other by time. Hence, if a coherence time of a radio channel is big, i.e., if Doppler effect on velocity is small, it is able to assume that the radio channel properties of the downlink are identical to those of and the uplink [This is called 'reciprocity']. Hence, a base station performs a channel estimation using reference signals (RSs) of user equipments, which are transmitted in uplink, and is then able to transmit downlink data using the estimated channel information in case of a downlink transmission. In particular, since the base station does not need to transmit a separate downlink RS in order to obtain a downlink channel information, it is able to obtain a gain in aspect of resource overhead. Since it is unnecessary to use RSs of which number amounts to the number of antennas in the massive MIMO that uses a massive number of antennas, it works as a big gain.

Yet, in case of FDD, a downlink and an uplink use different frequencies, respectively. Meanwhile, in case of TDD, a gap for a transition guard time on a frame structure should be considered in consideration of a round trip delay of a signal. In particular, if a cell coverage increases, a transition guard time increases to work as a reduction of throughput. Hence, restricted conditions are put on a cell coverage of TDD system in comparison with FDD system.

Moreover, TDD system should consider the same DL/UL configuration between base stations in order to control influence of interference between base stations adjacent to each other. And, there exists a restricted condition for matching UL/DL transmission synchronization between base stations. Such restricted conditions of TDD may become the condition for FDD to consider a duplex scheme of massive MIMO. Yet, unlike the case of TDD, FDD has the following disadvantages. First of all, a base station should transmit an RS to obtain a channel information on a downlink. Secondly, the base station should receive a feedback of channel information from a user equipment.

Figure 6:
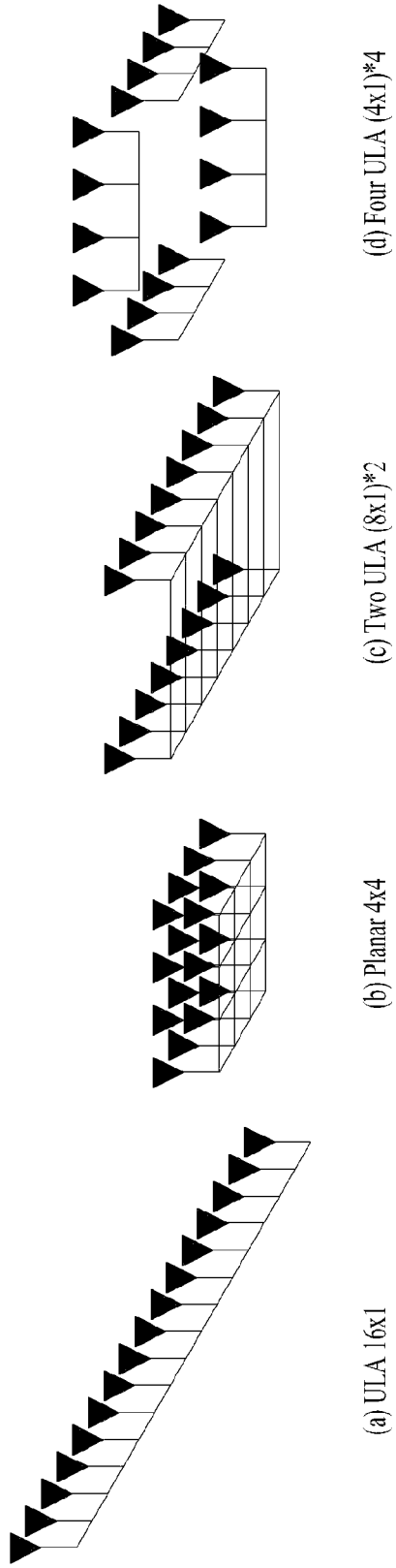
FIG. 6 is a diagram of various configuration types of a massive antenna usable for embodiments of the present invention.

FIG. 6 is a diagram of various configuration types of a massive antenna usable for embodiments of the present invention.

Referring to FIG. 6, antennas may have configurations shown in FIG. 6 depending on how they are arrayed in prescribed structures. In case of ULA (uniform linear array) antenna, it is advantageous in forming a very sharp beam in a horizontal direction. Yet, the ULA (uniform linear array) antenna has the following disadvantages. First of all, it is unable to form a beam in a vertical direction. Secondly, an overall length of antennas is very long. FIGS. 6 (b) to 6 (d) show cases of extending antennas of the ULA configuration type into 2-dimensional configuration types. They are disadvantageous in that a beam width in a horizontal direction is wider than that shown in FIG. 6 (a) but are advantageous in that a beam can be formed in a vertical direction as well. The massive antenna structures shown in FIG. 6 are exemplary only. And, it is able to configure a massive antenna using various number of antennas.

FIG. 7 is a diagram for one example of a beamforming usable for an embodiment of the present invention.

If the massive antennas of the 2-dimensional type shown in FIGS. 6 (b) to 6 (d) are used, it is able to perform a beamforming in a horizontal direction and a beamforming in a vertical beamforming. Through this, it is able to perform 3D-beamforming or full dimension beamforming. A case of a static vertical sectorization means that inner/outer sector is distinguished within a single cell coverage using a vertical beam. In this case, a sector can become the concept of a real physical sector, a real physical cell, a virtual sector, or a virtual cell. A case of a dynamic 3D beamforming is the concept of extending the static vertical sectorization UE-specifically and means that a beamforming is performed on a user equipment using a beam in a horizontal direction and a beam in a vertical direction both. For instance, FIG. 7 (a) shows one example of a semi-static vertical sectorization beamforming. And, FIG. 7 (b) shows one example of a dynamic 3D vertical sectorization beamforming. In case of FIG. 7 (a), a geographical region within a single cell can be sectorized into a donut shape. In case of FIG. 7 (b), a beamforming can be performed on a specific user equipment only.

Figure 8:
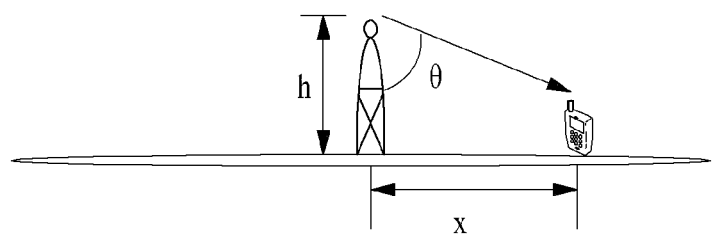
FIG. 8 is a diagram for relation between a base station and a user equipment in case of performing a beamforming in a vertical direction.

FIG. 8 is a diagram for relation between a base station and a user equipment in case of performing a beamforming in a vertical direction. And, FIG. 9 is a diagram for relation between a base station and a user equipment in case of performing a beamforming in a horizontal direction.

A general cellular network operates 3 sectors or cells in a single site and a base station is located at high altitude in order to secure LOS for user equipments or to perform a highly efficient transmission. Such a cell deployment triggers a difference between a vertical beam and a horizontal beam. In this case, 'difference' means that a variation of an angle of a beam transmitted by a base station differs depending on a vertical direction or a horizontal direction if a channel change between the base station and a user equipment is generated by a movement of the user equipment.

In particular, assuming that a beamforming is performed in aspect of a vertical beam only in FIG. 8, when a height of a base station is h, a user equipment has moved away from the base station by x, and an angle between the base station and the user equipment is $\theta$, a value of $\theta$ can be expressed as $$\arctan\frac{x}{h}.$$

Figure 9:
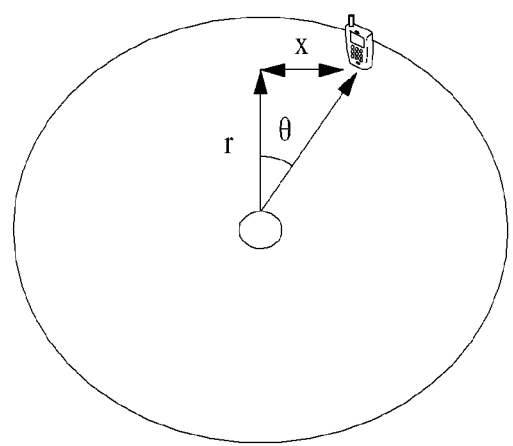
FIG. 9 is a diagram for relation between a base station and a user equipment in case of performing a beamforming in a horizontal direction.

On the other hand, assuming that a beamforming is performed in aspect of a horizontal beam only in FIG. 9, when a distance between an original location and a base station is r, a moved distance of the user equipment from the original location of the user equipment is r, and an angle between the base station and the user equipment is $\theta$, a value of $\theta$ can be expressed as $$\arctan\frac{x}{r}.$$

Since a base station is generally installed at a height of about several tens of meters and a radius of the base station is assumed as several hundreds of meters to several kilometers, the expressions $$h < r, \frac{x}{h} > \frac{x}{r}$$

are satisfied. In this case, if a user equipment is located very close to the base station, it is assumed that the above expressions are not met. Yet, in case of considering a distribution of a user equipment over a size of a cell, it is assumed that the above expressions are frequently met. Moreover, since arctan is an increasing function, $$\arctan\left(\frac{x}{h}\right) > \arctan\left(\frac{x}{r}\right)$$

is met. When a user equipment has moved by the same distance, it can be observed that an angle variation for a beamforming in a horizontal directions is smaller than that for a beamforming in a vertical direction.

Yet, a user equipment having small mobility highly tends to move at a low speed in a horizontal direction rather than a height varying direction. In case that a location of a user equipment is fixed, a time variation of a radio channel is generated by a location change of surrounding terrain feature and the surrounding terrain feature generally has mobility in a horizontal direction. Hence, a horizontal variation of a beam pattern sent to a user equipment may be more sensitive to a vertical variation.

Embodiments of the present invention mentioned in the following description propose a method of efficiently operating an RS usable for a user equipment to perform CQI or PMI feedback in downlink using the aforementioned properties.

4. RS Structure for Massive MIMO

LTE Release 8 System (hereinafter named Rel-8) proposes a cell-specific reference signal (CRS) for the purposes of a channel measurement on CQI feedback and a channel estimation on PDSCH. Yet, since LTE-A Release 10 (hereinafter named Rel-10) System, a channel state information reference signal (CSI-RS) has been proposed for the purpose of a channel estimation on PDSCH for Rel-10 UE separately from CRS of Rel-8.

4.1 CSI-RS Mapping Structure

Figure 10:
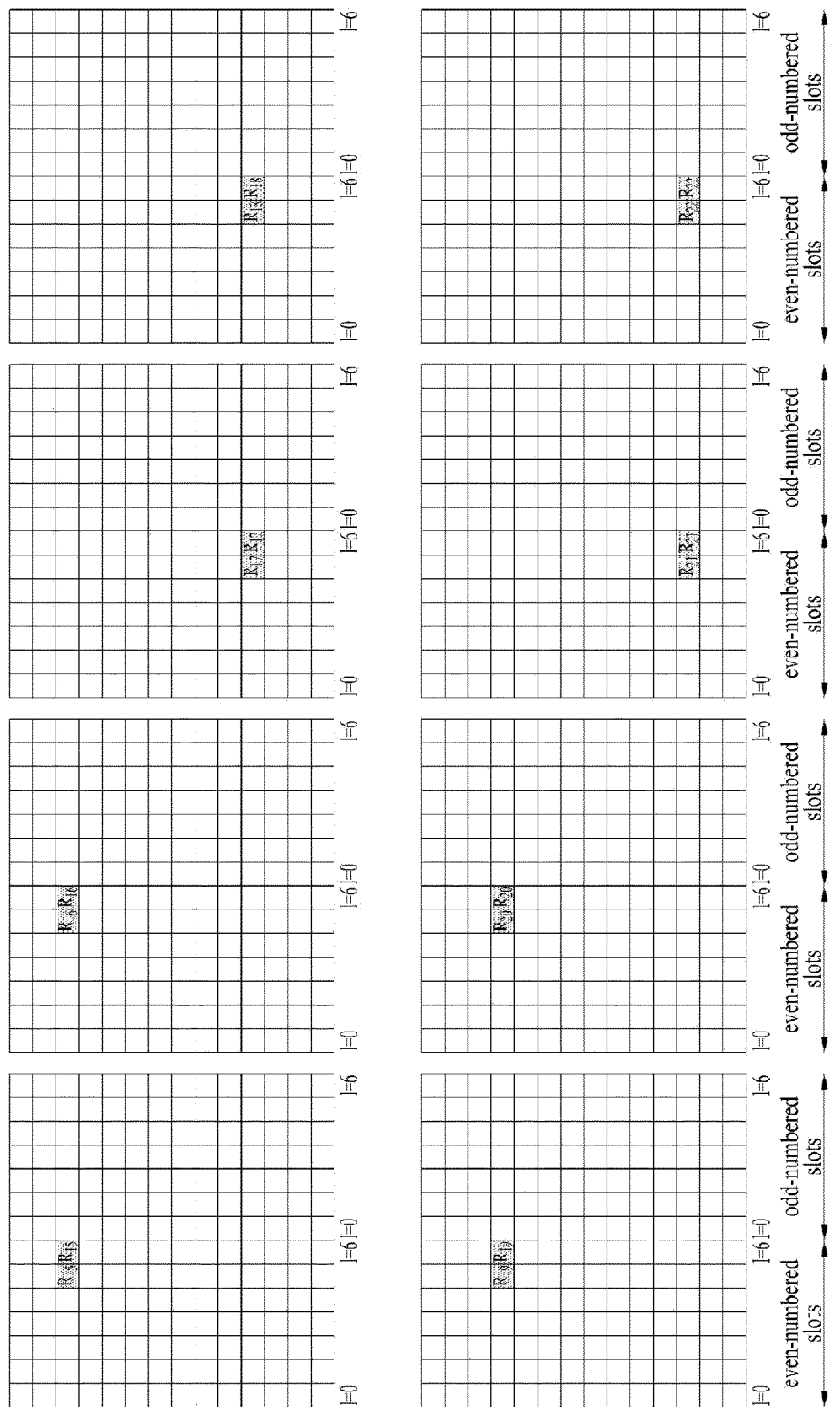
FIG. 10 is a diagram for one example of a mapping structure of CSI-RS usable for embodiments of the present invention.

FIG. 10 is a diagram for one example of a mapping structure of CSI-RS usable for embodiments of the present invention.

For CSI-Rs, unlike CRS, maximum 32 kinds of different CSI configurations are proposed to reduce intra-cell interference (ICI) in multi-cell environments including a heterogeneous network (HetNet) environment. The configurations for CSI-RS differ from each other in the number of antenna ports in a cell and are configured in a manner that neighboring cells have CSI-RS configurations as different as possible. They are distinguished from each other in accordance with CP types and are categorized into a case of applying to both FS1 and FS2 and a case of supporting FS2 only, depending on FS (Frame Structure) types. Finally, unlike CSI, CSI-RS supports maximum 8 antenna ports (p=15, p=15,16, p=15, . . . , 18, and p15, . . . , 22) and is defined for Δf=15 kHz.

4.2 CSI Configuration IE

CSI-RS configuration information element is used to specify CSI-RS configuration. Table 6 in the following shows one example of the CSI-RS configuration information element.

TABLE 6

```
-- ASN1START
CSI-RS-Config-r10 ::=       SEQUENCE {
        csi-RS-r10              CHOICE {
                release                         NULL,
                setup                           SEQUENCE {
                        antennaPortsCount-r10       ENUMERATED {an1, an2, an4, an8},
                        resourceConfig-r10 INTEGER (0..31),
                        subframeConfig-r10          INTEGER (0..154),
                        p-C-r10                     INTEGER (-8..15)
                }
        }                                       OPTIONAL,                           -- Need ON
        zeroTxPowerCSI-RS-r10   CHOICE {
                release                         NULL,
                setup                           SEQUENCE {
                        zeroTxPowerResourceConfigList-r10   BIT STRING (SIZE (16)),
                        zeroTxPowerSubframeConfig-r10       INTEGER (0..154)
                }
        }                                       OPTIONAL                            --
Need ON
}
-- ASN1STOP
```

In Table 6, an antenna port count (antennaPortsCount) parameter indicates the number of antennas for transmitting CSI-RS (select one of 1, 2, 4 and 8) (cf. TS 36.211 [21, 6.10.5]). A p-C parameter indicates a Pc parameter (cf. TS 36.213 [23, 7.2.5]). A resource configuration (resourceConfig) parameter indicates that CSI-RS is located at a prescribed RE within a single RB on Time-resource frequency (cf. TS 36.211 [21, table 6.10.5.2-1 and 6.10.5.2-2]). A subframe configuration (subframeConfig) parameter indicates that CSI-RS is transmitted in a prescribed subframe and CSI-RS EPRE value for PDSCH EPRE is transmitted. Moreover, an eNB can additionally transmit information on a zero power CSI-RS as well (cf. TS 36.211 [21, table 6.10.5.3-1]). $I_{CSI-RS}$ can be individually configured for CSI-RSs assumed as non-zero or zero transmission power by a user equipment. A zero transmission power resource configuration list (zeroTxPowerResourceConfigList) parameter indicates a configuration of a zero power CSI-RS transmitted on a specific RB (cf. TS 36.211 [21,6.10.5.2]). A zero transmission power subframe configuration (zero TxPower-SubframeConfig) parameter indicates a subframe in which a zero power CSI-RS is included (cf. TS 36.211 [21, table 6.10.5.3-1]).

Multi CSI RS configuration corresponding to 0 or 1 configuration configured by a user equipment with non-zero transmission power for a corresponding CSI-RS and 0 or more configurations configured with zero transmission power by a user equipment can be used in a given cell.

For each bit set to 1 in a 16-bit bitmap of ZeroPowerCSI-RS parameter configured by an upper layer, a user equipment excludes resource elements overlapping with non-zero transmission power CSI-RS configured by the upper layer and is able to assume resource elements corresponding to 4 CSI RS columns of Table 7 and Table 8 as zero transmission power. In this case, MSB (Most Significant Bit) corresponds to a smallest CSI RS configuration index and contiguous bits in a bitmap correspond to CSI RS configurations in ascending order, respectively.

CSI reference signals can be assigned to DL slots of $n_s$ mod 2 that satisfies the conditions shown in Table 7 and Table 8 only.

A user equipment is assumed as not transmitting CSI reference signals in specific subframes of frame structure type 2, subframes in which a transmission of CSI-RS may possibly collide with a transmission of synchronization signals, PBCH or a system information block type 1 (SystemInformationBlockType1) message, and subframes configured for a transmission of a paging message.

Resource elements (k, l) used for a transmission of CSI reference resource for an antenna port set S (S={15}, S={15, 16}, S={17, 18}, S={19, 20} or S={21, 22}) are not used for a transmission of PDSCH signal on any antenna port in the same slot and, CSI-RS is not transmitted on any antenna port within the set S in the same slot except an antenna port for transmitting the CSI-RS.

Table 7 shows mapping relation of a CSI reference signal configuration for a resource element (k', l') for a normal cyclic prefix (CP).

TABLE 7

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 8 shows mapping relation of a CSI reference signal configuration for a resource element (k', l') for an extended cyclic prefix (CP).

TABLE 8

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure | 0 | (11, 4) | 0 | (11, 4) | 0 | (11, 4) | 0 |
| | 1 | (9, 4) | 0 | (9, 4) | 0 | (9, 4) | 0 |

TABLE 8-continued

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| type 1 and 2 | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

A subframe configuration periodicity $T_{CSI-RS}$ indicating a CSI-RS existing location and a subframe offset $\Delta_{CSI-RS}$ are listed on Table 9. $I_{CSI-RS}$ parameter can be individually configured for CSI-RSs estimated as non-zero transmission power and zero transmission power by a UE. Subframes including CSI-RSs can be transmitted in a subframe that meets Formula 3 in the following.

$$(10n_f + \lfloor n_s/2 \rfloor - \Delta_{CSI-RS}) \mod T_{CSI-RS} = 0 \quad \text{[Formula 3]}$$

In Formula 3, TCSI-RS indicates a CSI-RS transmitted periodicity, $\Delta_{CSI-RS}$ means an offset value, $n_f$ indicates a system frame number, and $n_s$ means a slot number.

TABLE 9

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

4.3 Per-Antenna Port CSI-RS Transmitting Method-1

In an existing LTE system, since there is no proposal for 3D beamforming technology, the same CSI-RS configuration information is used for all antennas In the following description, according to an embodiment of the present invention, when a 3D beamforming uses CSI-RS for the purpose of a channel estimation on PDSCH for a UE, described are methods of setting a CSI-RS transmission period differently for each antenna port using a fact that an angle variation for vertical/horizontal beamforming is different.

Figure 11:
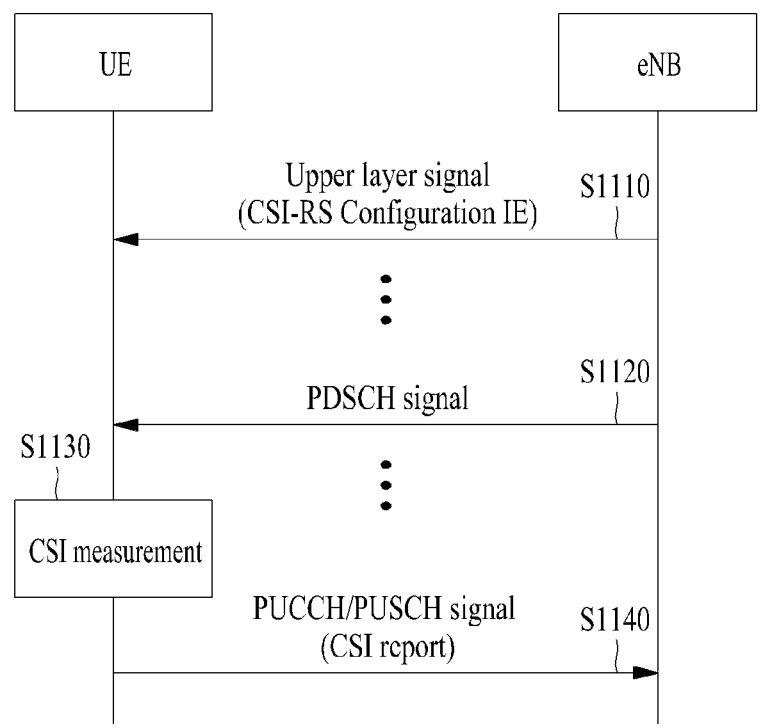
FIG. 11 is a diagram of one of methods of transmitting a CSI-RS configuration information for a 3D beamforming according to an embodiment of the present invention.

FIG. 11 is a diagram of one of methods of transmitting a CSI-RS configuration information for a 3D beamforming according to an embodiment of the present invention.

Referring to FIG. 11, a base station (eNB) transmits CSI-RS configuration information element (IE) to each user equipment using an upper layer signal. In doing so, information on a transmission period per antenna port for a 3D beamforming may be included in the CSI-RS configuration information element [S1110].

Subsequently, the base station transmits a PDSCH signal based on the CSI-RS configuration information element and the user equipment can measure a channel state information (CSI) on PDSCH based on the received CSI-RS configuration information element [S1120, S1130].

Moreover, the user equipment can report the measured CSI to the base station through a PUCCH signal and/or a PUSCH signal [S140].

In FIG. 11, the base station can differently set a CSI-RS transmission period of a logical antenna port which is mapped to a vertical physical antenna or used for a vertical beamforming. Parameters for setting a transmission period different per antenna port may be included in the CSI-RS configuration information element of the step S1110 shown in FIG. 11. To this end, a configuration for each antenna port should be individually defined. For the period setting of each antenna port, a CSI-RS subframe configuration $I_{CSI-RS}$ parameter value is preferably set for each antenna port. Table 10 in the following shows one example of a CSI-RS subframe configuration parameter defined for each antenna port.

TABLE 10

| Antenna port | CSI-RS-SubframeConfig ($I_{CSI-RS}$)/subframeConfig-r10 |
|---|---|
| 15 | INTEGER (0 . . . 154) |
| 16 | INTEGER (0 . . . 154) |
| 17 | INTEGER (0 . . . 154) |
| 18 | INTEGER (0 . . . 154) |
| 19 | INTEGER (0 . . . 154) |

TABLE 10-continued

| Antenna port | CSI-RS-SubframeConfig ($I_{CSI-RS}$)/subframeConfig-r10 |
|---|---|
| 20 | INTEGER (0 . . . 154) |
| 21 | INTEGER (0 . . . 154) |
| 22 | INTEGER (0 . . . 154) |

In Table 10, maximum 8 antenna ports are assumed. In case that a 3D beamforming is used, antenna ports more than those shown in Table 10 can be used. In this case, a CSI-RS subframe configuration parameter may be set for each antenna port.

Moreover, Table 11 in the following shows one example of a CSI configuration information element including CSI-RS subframe configuration parameters defined for each antenna port described with reference to Table 10.

TABLE 11

```
-- ASN1START
CSI-RS-Config-r10 ::=     SEQUENCE {
        csi-RS-r10              CHOICE {
                release                 NULL,
                setup                   SEQUENCE {
                    antennaPortsCount-r10       ENUMERATED {an1, an2, an4, an8},
                    resourceConfig-r10INTEGER (0..31),
                    subframeConfig-antennaPort15        INTEGER (0..154),
                    subframeConfig-antennaPort16        INTEGER (0..154),
                    subframeConfig-antennaPort17        INTEGER (0..154),
                    subframeConfig-antennaPort18        INTEGER (0..154),
                    subframeConfig-antennaPort19        INTEGER (0..154),
                    subframeConfig-antennaPort20        INTEGER (0..154),
                    subframeConfig-antennaPort21        INTEGER (0..154),
                    subframeConfig-antennaPort22        INTEGER (0..154),
                    p-C-r10                     INTEGER (-8..15)
                }
        }                               OPTIONAL,        -- Need ON
        zeroTxPowerCSI-RS-r10   CHOICE {
                release                 NULL,
                setup                   SEQUENCE {
                    zeroTxPowerResourceConfigList-r10  BIT STRING (SIZE (16)),
                    zeroTxPowerSubframeConfig-r10      INTEGER (0..154)
                }
        }                               OPTIONAL         --
Need ON
}
-- ASN1STOP
```

The CSI-RS configuration information elements described with reference to Table 10 and Table 11 show one example of a method of configuring a CSI-RS having a period different for each antenna. Moreover, it is able to configure a CSI-RS configuration information element in a manner that values for other parameter values (e.g., resourceConfig, p-c) included in the CSI-RS configuration information element are assigned for each antenna. According to this embodiment of the present invention, in order to assign a different CSI-RS value having a different period to each antenna, it can be represented through a different ASN code.

4.4 Per-Antenna Port CSI-RS Transmitting Method-2

Since the method described with reference to the chapter 4.3 should set a CSI-RS configuration per antenna port through an upper layer signaling (e.g., RRC signaling), it may work as considerable overhead on an upper layer. Hence, it is able to configure CSI-RS by defining antennas into a bundle of two or more antennas. Table 12 and Table 13 in the following show embodiments of a case that antenna ports are grouped into 2 sets, respectively.

TABLE 12

| Antenna Set Number | Antenna port Number |
|---|---|
| 0 | 15, 16, 17, 18 |
| 1 | 19, 20, 21, 22 |

TABLE 13

| Antenna Set Number | Antenna port Number |
|---|---|
| 0 | 15, 17, 19, 21 |
| 1 | 16, 18, 20, 22 |

Regarding antenna port sets grouped like Table 12 and Table 13, different CSI-RS configurations may be applied to the sets, respectively. For instance, in Table 12, antenna ports having antenna port numbers set to 15, 16, 17 and 18 configure one set, while antenna ports having antenna port numbers set to 19, 20, 21 and 22 configure another set. In this case, an antenna port set is identified by an antenna set number (antennaSetNumber) parameter, and a different CSI-RS transmission period is used for each antenna port set. The CSI-RS transmission period per antenna port set can be represented as Table 14 and may be expressed as ASN (Abstract Syntax Notation) code.

TABLE 14

| Antenna port set Number | CSI-RS-SubframeConfig ($I_{CSI-RS}$)/subframeConfig-r10 |
|---|---|
| 0 | INTEGER (0 . . . 154) |
| 1 | INTEGER (0 . . . 154) |

Table 15 in the following shows one example of a CSI-RS configuration information element for varying a CSI-RS transmission period per antenna port set described with reference to Tables 12 to 14. The CSI-RS configuration information element shown in Table 15 may be usable for the step S1110 shown in FIG. 11.

TABLE 15

```
-- ASN1START
CSI-RS-Config-r10 ::=      SEQUENCE {
        csi-RS-r10                     CHOICE {
             release                          NULL,
             setup                            SEQUENCE {
                  antennaPortsCount-r10        ENUMERATED {an1, an2, an4, an8},
                  antennaSetNumber1                    BIT STRING (SIZE (8)),
                  antennaSetNumber2                    BIT STRING (SIZE (8)),
             antennaportset           INTEGER (0..1),
                  resourceConfig-r10INTEGER (0..31),
                  subframeConfig-r10           INTEGER (0..154),
                  p-C-r10                                                  INTEGER
(-8..15)
             }
        }
                                      OPTIONAL,                 -- Need ON
        zeroTxPowerCSI-RS-r10          CHOICE {
             release                          NULL,
             setup                            SEQUENCE {
                  zeroTxPowerResourceConfigList-r10    BIT STRING (SIZE (16)),
                  zeroTxPowerSubframeConfig-r10        INTEGER (0..154)
             }
        }
                                      OPTIONAL              --    Need
ON
}
-- ASN1STOP
```

Table 16 in the following can transmit information on an existing CSI-RS configuration by multiplexing without using an antenna set number parameter for indicating an antenna set separately. Table 16 shows one example of a CSI-RS configuration information element in case that 2 antenna sets exist.

TABLE 16

```
-- ASN1START
CSI-RS-Config-r10 ::=      SEQUENCE {
        csi-RS-r10                     CHOICE {
             release                          NULL,
             setup                            SEQUENCE {
                  antennaPortsCount-r10        ENUMERATED {an1, an2, an4, an8},
                  resourceConfig-r10 INTEGER (0..31),
                  subframeConfig-r10           INTEGER {(0..154), (0..154)},
                  p-C-r10                      INTEGER (-8..15)
             }
        }                             OPTIONAL,                 -- Need ON
        zeroTxPowerCSI-RS-r10    CHOICE {
             release                          NULL,
             setup                            SEQUENCE {
                  zeroTxPowerResourceConfigList-r10    BIT STRING (SIZE (16)),
                  zeroTxPowerSubframeConfig-r10              INTEGER (0..154)
             }
        }                             OPTIONAL                  -- Need
ON
}
-- ASN1STOP
```

In Table 16, in case that 2 antenna sets exist, a subframe configuration (subframeConfig) parameter is represented by multiplexing in accordance with an antenna set. If 3 or more antenna sets exist, a subframe configuration parameter can be represented by multiplexing in accordance with the number of antenna sets.

4.4 Per-Antenna Port CSI-RS Transmitting Method-3

Although the methods described with reference to the chapters 4.3 and 4.4 relate to a method of designating a CSI-RS configuration by upper layer signaling, an embodiment of the present invention described in the following can change a CSI-RS configuration per antenna port (i.e., vertical antenna port) in case of mapping CSI-RS to RE in a physical layer.

Table 17 in the following shows one of tables for mapping a CSI-RS configuration used for a case of a normal cyclic prefix to RE.

TABLE 17

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 ($n_s$ mod 4) |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 ($n_s$ mod 4) | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 ($n_s$ mod 4) | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 ($n_s$ mod 4) |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 ($n_s$ mod 4) | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 ($n_s$ mod 4) | | | | |

Table 18 in the following shows one of tables for mapping a CSI-RS configuration used for a case of an extended cyclic prefix to RE.

TABLE 18

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 ($n_s$ mod 4) |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 ($n_s$ mod 4) | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 ($n_s$ mod 4) | | | | |

TABLE 18-continued

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 ($n_s$ mod 4) |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 ($n_s$ mod 4) | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 ($n_s$ mod 4) | | | | |

The embodiment shown in the chapter 4.3 corresponds to a case that a last CSI-RS configuration is set to have a period two times longer than an existing period for a CP length and a frame structure. Of course, in Table 17 or Table 18, it is able to additionally insert a CSI-RS configuration having a period set longer or smaller than an existing period not by two times but by a predetermined multiple.

In this case, when a user equipment receives a CSI-RS configuration index included in a CSI-RS configuration information element through upper layer signaling, the user equipment can transmit CSI-RS by varying a transmission period of the CSI-RS by two times or a multiple determined by a system in case of a last CSI-RS configuration in accordance with the number of antenna ports in Table 17 or Table 18.

4.6 Per-Antenna Port CSI-RS Transmitting Method-4

A method of adjusting a CSI-RS transmission period according to another embodiment of the present invention relates to a scheme of modifying a formula disclosed in Formula 3 for a specific CSI-RS configuration.

Formula 4 in the following relates to a modification of Formula 3.

$$(10n_f + \lfloor n_s/2 \rfloor - \Delta_{CSI-RS}) \bmod (T_{CSI-RS} \cdot k) = 0 \quad \text{[Formula 4]}$$

In Formula 4, a value of k is a randomly fixed constant value and can be used in a system by being fixed. Alternatively, the value of k can be transmitted to a user equipment through upper layer signaling together with a specific CSI-RS configuration. In particular, in case of using Formula 4, CSI-RSs can be transmitted with the periodicity amounting to the value of the constant 'k'.

5. Implementation Device

Figure 12:
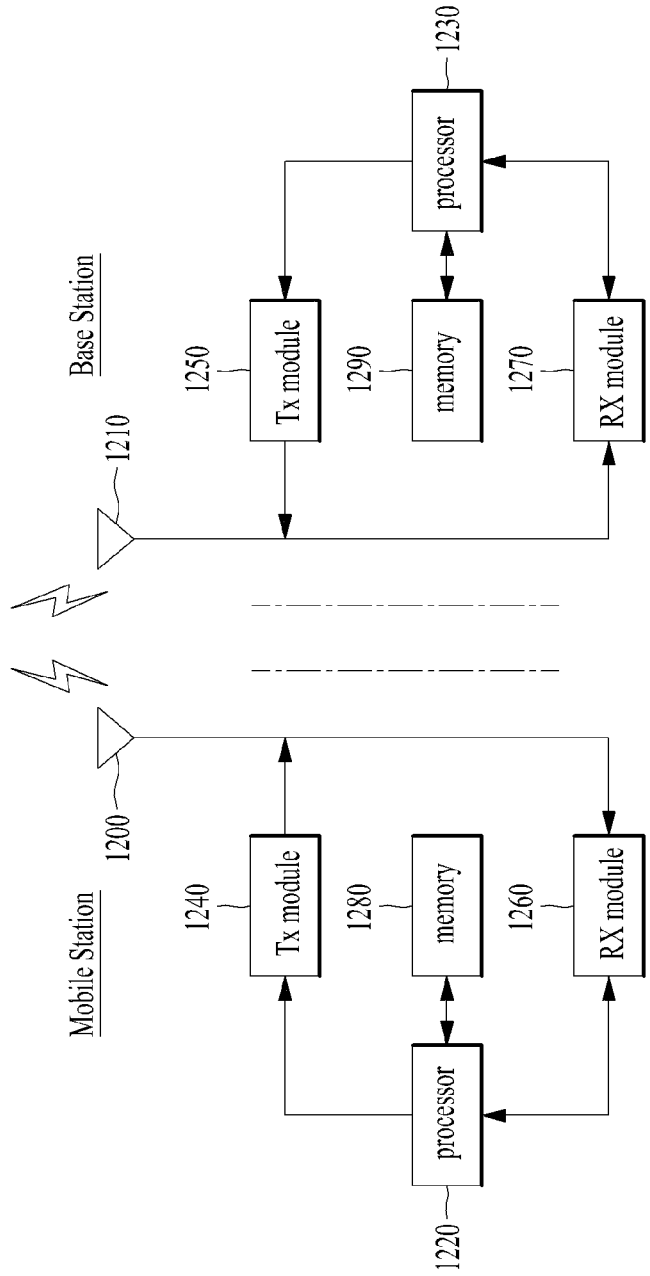
FIG. 12 illustrates a device including the means for implementing the methods described with reference to FIGS. 1 to 11.

FIG. 12 illustrates a device including the means for implementing the methods described with reference to FIGS. 1 to 11.

First of all, a user equipment (UE) may operate as a transmitter in uplink or a receiver in downlink. A base station (eNB: e-Node B) may operate as a receiver in uplink or a transmitter in downlink.

In particular, the user equipment can include a transmitting module (Tx module) 1240 and a receiving module (Rx module) 1260 to control transmission and reception of information, data and/or message. The base station can include a transmitting module (Tx module) 1250 and a receiving module (Rx module) 1270 to control transmission and reception of information, data and/or message. The user equipment and the base station can include antennas 1600 and 1610 and the like to receive information, data and/or messages, respectively. Both of the transmitting module and the receiving module may be configured with a transceiver configured to perform transmission and reception simultaneously.

Moreover, the user equipment and the base station can include processors 1220 and 1230 for performing embodiments of the present invention and memories 1280 and 1290 for storing processing procedures of the processors temporarily or permanently, respectively.

Using the above-described components and functions of the user equipment and base station, embodiments of the present invention can be performed. For instance, the processor of the base station can configure CSI-RS in a manner of using the methods disclosed in the above-mentioned chapters 1 to 4 individually or combinably and is able to transmit a created CSI-RS configuration information element to the user equipment by upper layer signaling. Based on the received CSI-RS configuration information element, the user equipment can be aware of a CSI-RS transmission pattern, a transmission period and the like. Hence, the user equipment can receive CSI-RS based on these informations.

The transmitting and receiving modules included in each of the user equipment and the base station can perform a packet modulation/demodulation function for data transmission, a fast packet channel coding function, an OFDMA (orthogonal frequency division multiple access) packet scheduling function, a TTD (time division duplex) packet scheduling function and/or a channel multiplexing function. Moreover, each of the user equipment and the base station shown in FIG. 12 can further include a low power RF/IF (radio frequency/intermediate frequency) module.

Meanwhile, in the present invention, a mobile station can include one of a personal digital assistant (PDA), a cellular phone, a personal communication service (PCS) phone, a GSM (global system for mobile) phone, a WCDMA (wideband CDMA) phone, an MBS (mobile broadband system) phone, a hand-held PC, a notebook PC, a smart phone, a MM-MB (multimode-multiband) terminal and the like.

In this case, the smart phone is a terminal provided with advantages of a mobile communication terminal and a PDA. The smart phone may mean a terminal in which a schedule management function of a PDA, data communication functions of fax transmission/reception, internet access, etc. are integrated on a mobile communication terminal. And, the multimode-multiband terminal means a terminal having a built-in multi-MODEM chip to be operable in a portable internet system and other mobile communication systems (e.g., CDMA (code division multiple access) 2000 system, WCDMA (wideband CDMA) system, etc.).

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in the memory unit 1680/1690 and is then drivable by the processor 1620/1630. The memory unit is provided within or outside the processor to exchange data with the processor through the various well-known means.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention are applicable to various kinds of wireless access systems. For example, the various kinds of the wireless access systems may include 3GPP (3$^{rd}$ Generation Partnership Project), 3GPP2, IEEE 802.xx (Institute of Electrical and Electronic Engineers 802.xx) system and/or the like. The embodiments of the present invention are applicable to all of the wireless access system applied technical fields as well as to the aforementioned various kinds of the wireless access systems.

What is claimed is:

1. A method for receiving a channel state information reference signal (CSI-RS) in a wireless access system, the method comprising:
    receiving a CSI-RS configuration information element to be used for 3 dimensional beamforming, wherein the CSI-RS configuration information element includes antenna set number parameters indicating antenna port groups and CSI-RS subframe configuration parameters indicating different transmission periods of the CSI-RS for each of the antenna port groups;
    receiving the CSI-RS for the each of the antenna port groups based on the CSI-RS configuration information element; and
    obtaining a channel state information for the each of the antenna port groups based on the received CSI-RS for the each of the antenna port groups,
    wherein the each of the antenna port groups has grouped for vertical beamforming and horizontal beamforming of the 3 dimensional beamforming, and
    wherein the each of the antenna port groups includes two or more antennas.

2. The method of claim 1, wherein the CSI-RS configuration information element is received via a higher layer signal.

3. The method of claim 1, further comprising: reporting the channel state information to a base station.

4. A user equipment (UE) for receiving a channel state information reference signal (CSI-RS) in a wireless access system, the UE comprising:
    a transceiver; and
    a processor configured to control the CSI-RS reception, the processor configured to receive a CSI-RS configuration information element to be used for 3 dimensional beamforming to receive the CSI-RS for each of antenna port groups based on the CSI-RS configuration information element, and to obtain a channel state information for the each of the antenna port groups based on the received CSI-RS, using the transceiver,
    wherein the CSI-RS configuration information element includes antenna set number parameters indicating the each of the antenna port groups and CSI-RS subframe configuration parameters indicating different transmission periods of the CSI-RS for the each of the antenna port groups,
    wherein the each of the antenna port groups has grouped for vertical beamforming and horizontal beamforming of the 3 dimensional beamforming, and
    wherein the each of the antenna port groups includes two or more antennas.

5. The user equipment of claim 4, wherein the CSI-RS configuration information element is received via a higher layer signal.

6. The user equipment of claim 4, wherein the processor is configured to report the channel state information to a base station using the transceiver.

7. Method for transmitting a channel state information reference signal (CSI-RS) in a wireless access system, the method comprising:
    transmitting a CSI-RS configuration information element to be used for 3 dimensional beamforming, wherein the CSI-RS configuration information element includes antenna set number parameters indicating antenna port groups and CSI-RS subframe configuration parameters indicating different transmission periods of the CSI-RS for each of the antenna port groups; and
    transmitting the CSI-RS for the each of the antenna port groups based on the CSI-RS configuration information element;
    wherein the each of the antenna port groups has grouped for vertical beamforming and horizontal beamforming of the 3 dimensional beamforming, and
    wherein the each of the antenna port groups includes two or more antennas.

8. The method of claim 7, wherein the CSI-RS configuration information element is received via a higher layer signal.

9. The method of claim 7, further comprising:
    receiving a report including channel state information for the each of the antenna port groups obtained based on the CSI-RS.

10. An evolved Node B (eNB) for transmitting a channel state information reference signal (CSI-RS) in a wireless access system, the eNB comprising:
- a transceiver; and
- a processor configured to control the CSI-RS transmission, the processor configured to transmit a CSI-RS configuration information element to be used for 3 dimensional beamforming, to transmit the CSI-RS for each of antenna port groups based on the CSI-RS configuration information element,
- wherein the CSI-RS configuration information element includes antenna set number parameters indicating the each of the antenna port groups and CSI-RS subframe configuration parameters indicating different transmission periods of the CSI-RS for the each of the antenna port groups,
- wherein the each of the antenna port groups has grouped for vertical beamforming and horizontal beamforming of the 3 dimensional beamforming, and
- wherein the each of the antenna port groups includes two or more antennas.

11. The eNB of claim 10, wherein the CSI-RS configuration information element is transmitted via a higher layer signal.

12. The eNB of claim 10, wherein the processor is configured to receive a report including channel state information for the each of antenna port groups obtained based on the CSI-RS.

* * * * *